US012602632B2

(12) United States Patent
Choi et al.

(10) Patent No.: US 12,602,632 B2
(45) Date of Patent: Apr. 14, 2026

(54) WORK CHAT ROOM-BASED TASK MANAGEMENT APPARATUS AND METHOD

(71) Applicants: Delta PDS CO., LTD., Seoul (KR); Jae Ho Choi, Seoul (KR); Seo Hyun Choi, Seoul (KR)

(72) Inventors: Jae Ho Choi, Seoul (KR); Seo Hyun Choi, Seoul (KR)

(73) Assignees: DELTA PDS CO., LTD., Seoul (KR); Jae Ho Choi, Seoul (KR); Seo Hyun Choi, Seoul (KR)

( * ) Notice: Subject to any disclaimer, the term of this patent is extended or adjusted under 35 U.S.C. 154(b) by 107 days.

(21) Appl. No.: 18/541,609

(22) Filed: Dec. 15, 2023

(65) Prior Publication Data

US 2024/0220879 A1 Jul. 4, 2024

(30) Foreign Application Priority Data

Jan. 3, 2023 (KR) ........................ 10-2023-0000690

(51) Int. Cl.
*G06Q 10/0631* (2023.01)
*H04L 12/18* (2006.01)
(52) U.S. Cl.
CPC .... *G06Q 10/06311* (2013.01); *H04L 12/1813* (2013.01)
(58) Field of Classification Search
CPC .. G06Q 10/10; G06Q 10/06; G06Q 10/06311; G06Q 10/103
See application file for complete search history.

(56) References Cited

U.S. PATENT DOCUMENTS 10,394,543 B2 * 8/2019 Muller ................. G06Q 10/101
11,245,651 B2 * 2/2022 Qiu ........................ H04L 51/046
(Continued)

FOREIGN PATENT DOCUMENTS

KR 10-2020-0020194 A 2/2020
WO WO-2022031134 A1 * 2/2022 ........... G06F 40/216

OTHER PUBLICATIONS

D. Zhou, R. Ran, X. Huang, J. Bo, Z. Yang and H. Wang, "Instant Messaging Tool Task Collaboration Platform," 2020 International Wireless Communications and Mobile Computing (IWCMC), Limassol, Cyprus, 2020, pp. 1192-1195, doi: 10.1109/IWCMC48107.2020. 9148481 (Year: 2020).*

(Continued)

*Primary Examiner* — Maria C Santos-Diaz
(74) *Attorney, Agent, or Firm* — Paratus Law Group, PLLC

(57) ABSTRACT

An apparatus for managing tasks based on a business chat room, includes a business chat room creation unit for creating a business chat room in response to a request for the creation of a chat room related to a project in the process of advancing the project; a message sharing unit for generating chat messages between work participants and work-related messages regarding the project and allowing the messages to be shared in the business chat room; a task creation unit for creating one or more tasks that are uniquely connected to the chat messages or the work-related messages and are in a hierarchical relationship with the messages and storing the tasks in association with the messages; and a task search unit for providing a list of tasks created in the business chat room at the requests of the work participants.

13 Claims, 9 Drawing Sheets

(56) References Cited

U.S. PATENT DOCUMENTS

| | | | |
|---|---|---|---|
| 2021/0126805 A1* | 4/2021 | Archer | H04L 12/1813 |
| 2021/0342785 A1* | 11/2021 | Mann | G06F 16/258 |
| 2022/0092518 A1* | 3/2022 | Choi | G06Q 10/06316 |
| 2023/0161737 A1* | 5/2023 | Madisetti | G06F 16/1815 |
| | | | 707/608 |
| 2024/0272920 A1* | 8/2024 | Morales | H04L 65/4053 |

OTHER PUBLICATIONS

L. Gericke, R. Gumienny and C. Meinel, "Message capturing as a paradigm for asynchronous digital whiteboard interaction," 6th International Conference on Collaborative Computing: Networking, Applications and Worksharing (CollaborateCom 2010), Chicago, IL, USA, 2010, pp. 1-10 (Year: 2010).*

K. Funakoshi et al., "Semantic interoperability in tools for inter-cultural collaboration," Proceedings of the 2005 International Conference on Active Media Technology, 2005. (AMT 2005)., Kagawa, Japan, 2005, pp. 187-192 (Year: 2005).*

* cited by examiner

<u>100</u>

<u>130</u>

<u>130</u>

WORK CHAT ROOM-BASED TASK MANAGEMENT APPARATUS AND METHOD

CROSS-REFERENCE TO PRIOR APPLICATION

This application claims priority to Korean Patent Application No. 10-2023-0000690 (filed on Jan. 3, 2023), which is hereby incorporated by reference in its entirety.

BACKGROUND

The present disclosure relates to technology for managing tasks, and, more specifically, to technology for facilitating effective performance of work and projects by providing a means for communication between work participants based on a work chat room in the process of advancing the projects.

In general, online messengers correspond to applications that transmit texts or messages containing graphics between users, and are in the form of chat rooms in which multiple users participate. According to an embodiment of the present disclosure, the online messengers may include a mobile messenger operated in a mobile environment (e.g., a mobile phone) and KakaoTalk, Line, WeChat, Facebook Messenger, etc. In addition, such mobile messengers are increasingly being used in a variety of ways for business management and progress.

In particular, as projects grow in scale and become more complex in structure, more chat rooms where multiple business participants join at the same time are required for a single project. In the process of communication that occurs simultaneously in multiple chat rooms, it may be difficult for business participants to easily understand the flow of related work.

In other words, while a chat room as a channel for communication can facilitate communication between work participants, it is difficult for each work participant to track the flow of work due to multiple chat rooms going on at the same time and various objects shared in the chat rooms. Therefore, a means for effectively managing work needed based on a dedicated chat room for each work unit may be necessary.

PRIOR ART DOCUMENT

Korean Patent Publication No. 10-2020-0020194 (published on Feb. 26, 2020)

SUMMARY

The present disclosure is aimed at providing an apparatus and a method for managing tasks based on a business chat room, which facilitate effective performance of work and projects by providing a means for communication between work participants based on the work chat room in the process of advancing the projects.

According to an embodiment of the present disclosure, an apparatus for managing tasks based on a business chat room may include a business chat room creation unit for creating a business chat room in response to a request for the creation of a chat room related to a project in the process of advancing the project; a message sharing unit for generating chat messages between work participants and work-related messages regarding the project and allowing the messages to be shared in the business chat room; a task creation unit for creating one or more tasks that are uniquely connected to the chat messages or the work-related messages and are in a hierarchical relationship with the messages and storing the tasks in association with the messages; and a task search unit for providing a list of tasks created in the business chat room at the requests of the work participants.

The message sharing unit may create objects such as notes, files, and photos related to the project and allow the objects to be shared in the business chat room.

The message sharing unit may create connected objects of the same type that are uniquely linked to each of the notes, the files, the photos, and the messages.

The message sharing unit may provide an interface for creating the connected object, and, when a connected object that is uniquely connected to an object shared in another business chat room is created in the interface, it may allow the connected object to be shared in the other business chat room.

When creating a second object of the same type that is uniquely linked to a first object, the message sharing unit may create a link defining the hierarchical structure between the first and second objects.

The task creation unit may create independent tasks uniquely linked to each of the notes, the files, the photos, and the tasks.

The task creation unit may allow the task to be shared in the business chat room when the task is created.

When creating a second task uniquely connected to a first task, the task creation unit may create a link defining a hierarchical structure between the first and second tasks.

When a task not connected to a specific object is created, the task creation unit may automatically connect the task to the most recent object in the business chat room or to an object selected by the work participant after recommending objects that can be connected to the task.

The task creation unit may provide a user interface for creating a task through the business chat room and receive a signal for requesting the creation of the at least one task through the user interface.

When the task is created, the task creation unit may generate and share a log message regarding the creation of the task through the business chat room.

When the task is created, the task creation unit may update the corresponding message by adding a first signal thereto.

When the task is created and there is another task in the hierarchical relationship with the task, the task creation unit may update the corresponding message by adding a second signal distinct from the first signal thereto.

The task search unit may provide a list of the tasks and may search for and provide at least one of messages, files, photos, and tasks for each task on the list according to the selection of the work participants.

When a specific task on the list is repeatedly selected, the task search unit may sequentially access other tasks in the hierarchical relationship with the specific task each time the task is selected.

According to an embodiment of the present disclosure, a method of managing tasks based on a business chat room may involve creating a business chat room in response to a request for the creation of a chat room related to a project in the process of advancing the project, through a business chat room creation unit; generating chat messages between work participants and work-related messages regarding the project and allowing the messages to be shared in the business chat room, through a message sharing unit; creating one or more tasks that are uniquely connected to the chat messages or the work-related messages and are in a hierarchical relationship with the messages and storing the tasks in association with the messages, through a task creation unit; and providing a list of tasks created in the business chat room at the requests of the work participants, through a task search unit.

The disclosed art may have the following effects. However, it does not mean that a specific embodiment has to include all of the effects or only the effects, so the scope of the claims of the disclosed art should not be understood as being limited thereby.

According to an embodiment of the present disclosure, it may be possible for the apparatus and the method for managing tasks based on a business chat room to facilitate effective performance of work and projects by providing a means for communication between work participants based on the work chat room in the process of advancing the projects.

DETAILED DESCRIPTION

Figure 1:
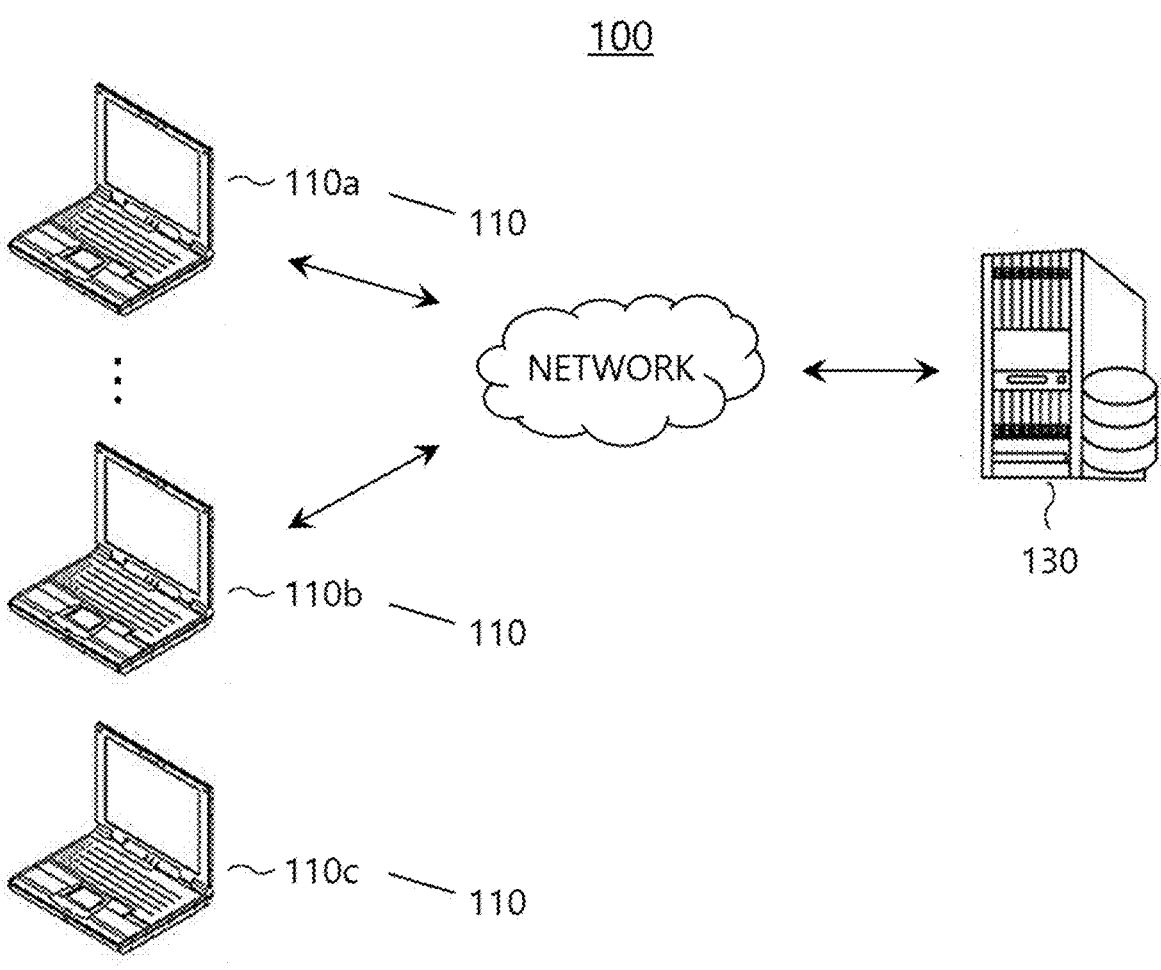
FIG. 1 is a view for illustrating a system for managing tasks according to the present disclosure.

Since the description of the present disclosure is merely an embodiment for structural or functional explanation, the scope of the present disclosure should not be construed as being limited by the embodiments described in the text. That is, since the embodiments may be variously modified and may have various forms, the scope of the present disclosure should be construed as including equivalents capable of realizing the technical idea. In addition, a specific embodiment is not construed as including all the objects or effects presented in the present disclosure or only the effects, and therefore the scope of the present disclosure should not be understood as being limited thereto.

On the other hand, the meaning of the terms described in the present application should be understood as follows.

Terms such as "first" and "second" are intended to distinguish one component from another component, and the scope of the present disclosure should not be limited by these terms. For example, a first component may be named a second component and the second component may also be similarly named the first component.

It is to be understood that when one element is referred to as being "connected to" another element, it may be connected directly to or coupled directly to another element or be connected to another element, having the other element intervening therebetween. On the other hand, it is to be understood that when one element is referred to as being "connected directly to" another element, it may be connected to or coupled to another element without the other element intervening therebetween. Meanwhile, other expressions describing a relationship between components, that is, "between," "directly between," "neighboring to," "directly neighboring to," and the like, should be similarly interpreted.

It should be understood that the singular expression includes the plural expression unless the context clearly indicates otherwise, and it will be further understood that the terms "comprises" or "have" used in this specification, specify the presence of stated features, numerals, steps, operations, components, parts, or a combination thereof, but do not preclude the presence or addition of one or more other features, numerals, steps, operations, components, parts, or a combination thereof.

Identification symbols (for example, a, b, and c) for individual steps are used for the convenience of description. The identification symbols are not intended to describe an operation order of the steps. Therefore, unless otherwise explicitly indicated in the context of the description, the steps may be executed differently from the stated order. In other words, the respective steps may be performed in the same order as stated in the description, actually performed simultaneously, or performed in reverse order.

The present disclosure may be implemented in the form of program code in a computer-readable recording medium. A computer-readable recording medium includes all kinds of recording devices storing data that a computer system may read. Examples of a computer-readable recording medium include a ROM, a RAM, a CD-ROM, a magnetic tape, a floppy disk, and an optical data storage device. Also, the computer-readable recording medium may be distributed over computer systems connected through a network so that computer-readable code may be stored and executed in a distributed manner.

Unless defined otherwise, all the terms used in the present disclosure provide the same meaning as understood generally by those skilled in the art to which the present disclosure belongs. Those terms defined in ordinary dictionaries should be interpreted to have the same meaning as conveyed in the context of related technology. Unless otherwise defined explicitly in the present disclosure, those terms should not be interpreted to have ideal or excessively formal meaning.

FIG. 1 is a view for illustrating a system for managing tasks according to the present disclosure.

Referring to FIG. 1, a system for managing tasks 100 may include a plurality of user's terminals 110 and an apparatus 130 for managing tasks.

The user's terminal 110 may correspond to a computing device operated by a user. For example, the user's terminal 110 may be a desktop, a laptop, a tablet PC, a smartphone, etc., but is not necessarily limited thereto and may be in the form of a variety of devices.

There may be one or more user's terminals 110, and, in this case, it may be any one or more of a first user's terminal 110a, a second user's terminal 110b, and a third user's terminal 110c. For convenience, the user's terminal 110 used by the first user may be referred to as the first user's terminal 110a, the user's terminal 110 used by the second user may be referred to as the second user's terminal 110b, and the user's terminal 110 used by the third user 110 may be referred to as the third user's terminal 110c.

According to an embodiment of the present disclosure, a plurality of users may be included in one or more user groups. The one or more user groups may be referred to as a first user group, a second user group, a third user group, etc. Meanwhile, one user may be included in one or more user groups at the same time.

In addition, multiple users may participate in a common project or task. Here, there may be one overall project, and the overall project may include multiple work projects carried out independently. Furthermore, plans, cards, notes, tasks, etc. may be created and stored in connection with the overall work project.

Here, a plan may correspond to a work plan created to achieve a specific goal, a card may correspond to a management card for a series of tasks, a note may correspond to a work record for storing work-related matters, and a task may correspond to various unit tasks created and processed according to the plan, the card, or the note. In addition, objects such as messages, files, and photos (or videos) may be shared between users in the process of processing plans, cards, notes, or tasks, and a business chat room may be provided to allow users to communicate and share objects. Here, messages shared through the business chat room may include chat messages and work-related messages.

According to an embodiment of the present disclosure, at least one of the user's terminals 110 may be a mobile terminal and may be connected to the apparatus 130 for managing tasks through a cellular communication or a Wi-Fi communication. According to another embodiment of the present disclosure, at least one of the user's terminals 110 may be a desktop and may be connected to the apparatus 130 for managing tasks through the Internet.

The apparatus 130 for managing tasks may correspond to a computing device that can be connected to at least one user's terminal 110 through a network. According to an embodiment of the present disclosure, the apparatus 130 for managing tasks may manage at least one user group in which other users associated with one user are members, that is, task participants.

According to an embodiment of the present disclosure, the apparatus 130 for managing tasks may be connected to the user's terminal 110 through a dedicated agent installed on the user's terminal 110. Here, the dedicated agent may correspond to an agent program, which is software that, when installed on the user's terminal 110, allows the user's terminal 110 and the apparatus 130 for managing tasks to interact with each other under the approval of the user's terminal 110.

Meanwhile, the connection and the combination between the apparatus 130 for managing tasks and the user's terminal 110, which have been described above, may only be according to one embodiment of the present disclosure, and it is needless to say that they can be changed into various forms within the normal range according to various operating environments.

Figure 2:
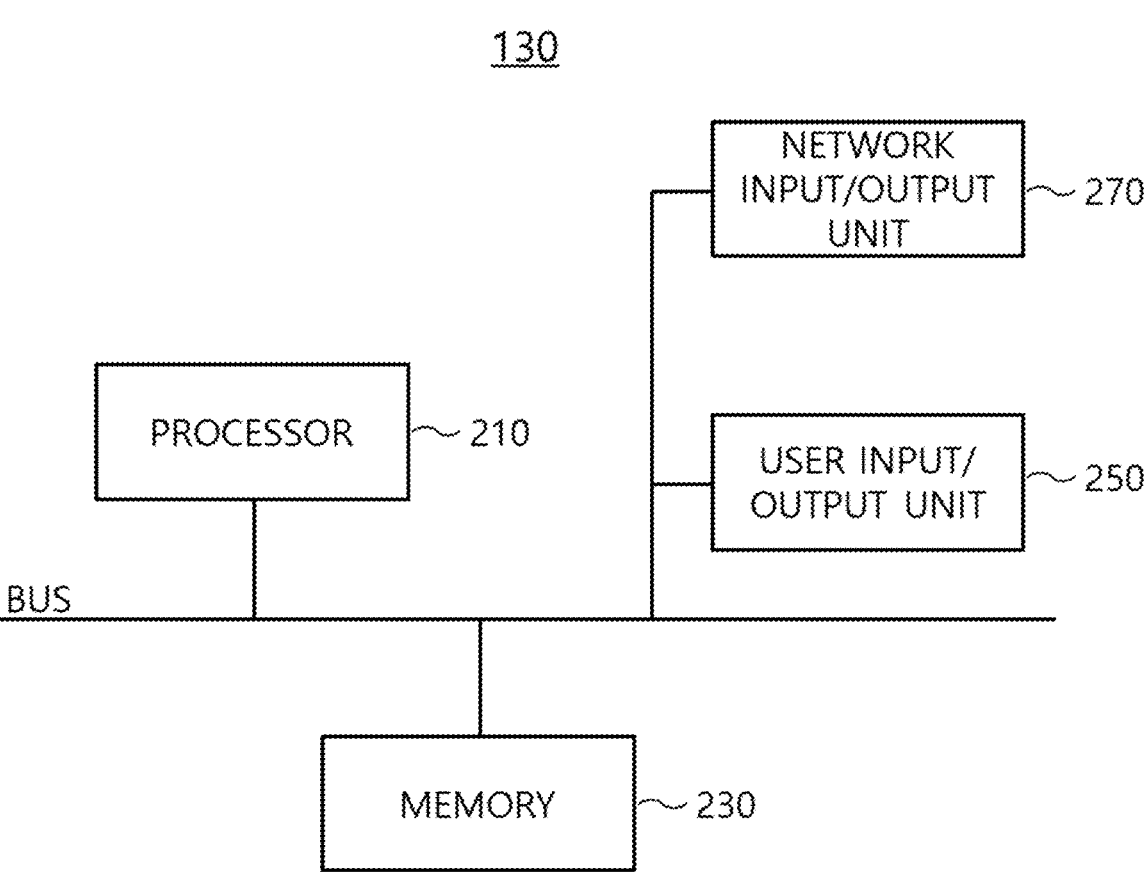
FIG. 2 is a view for illustrating components of the system of the apparatus for managing tasks in FIG. 1.

FIG. 2 is a view for illustrating components of the system of the apparatus for managing tasks in FIG. 1.

Referring to FIG. 2, the apparatus 130 for managing tasks may include a processor 210, a memory 230, a user input/output unit 250, and a network input/output unit 270.

The processor 210 may carry out a procedure for task management based on a business chat room according to the present disclosure, may manage the memory 230 that is read or written in this process, and may schedule the synchronization time between a volatile memory and a non-volatile memory in the memory 230.

The processor 210 may control the overall operation of the apparatus 130 for managing tasks and may be electrically connected to the memory 230, the user input/output unit 250, and the network input/output unit 270 so as to control data flow therebetween. The processor 210 may be a central processing unit (CPU) or a graphics processing unit (GPU) of the apparatus 130 for managing tasks.

The memory 230 may include an auxiliary memory device that is in the form of a non-volatile memory such as a solid state disk (SSD) or a hard disk drive (HDD) and used to store all data required for the apparatus 130 for managing tasks and a main memory device in the form of a volatile memory such as a random access memory (RAM). As such, the memory 230 may be a volatile or non-volatile memory, and, when it is a non-volatile memory, it may be connected through a hyperlink.

The user input/output unit 250 may include an environment for receiving data input by a user and an environment for outputting specific information to the user, and may include an adapter such as a mouse, a trackball, a touchpad, a graphics tablet, a scanner, a touch screen, a keyboard, or a pointing device or an output device including an adapter such as an input device, a monitor, or a touch screen, which is connected thereto. According to an embodiment of the present disclosure, the user input/output unit 250 may correspond to a computing device connected by a remote connection, and, in such case, the apparatus 130 for managing tasks may serve as a server.

The network input/output unit 270 may provide a communication environment for connection to the user's terminal 110 through a network, and may include an adapter for communications such as a local area network (LAN), a metropolitan area network (MAN), a wide area network (WAN), and a value added network (VAN). In addition, the network input/output unit 270 may be designed to provide a short-distance communication such as Wi-Fi and Bluetooth or a 4G or higher wireless communication for wireless data transmission.

Figure 3:
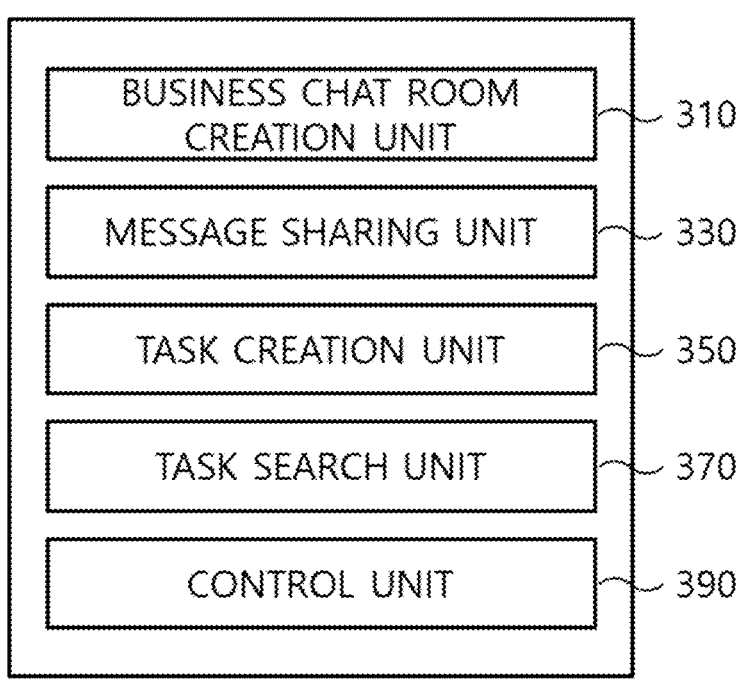
FIG. 3 is a view for illustrating functional components of the apparatus for managing tasks in FIG. 1.

FIG. 3 is a view for illustrating functional components of the apparatus for managing tasks in FIG. 1.

Referring to FIG. 3, the apparatus 130 for managing tasks may include a business chat room creation unit 310, a message sharing unit 330, a task creation unit 350, a task search unit 370, and a control unit 390.

In this case, according to an embodiment of the present disclosure, all of the above-mentioned functional components do not have to be included at the same time, and, depending on embodiments, some of the aforementioned components may be omitted, or some or all of the components may be selectively included. In addition, according to an embodiment of the present disclosure, an independent module selectively including some of the above-mentioned components may be provided, and a method of managing tasks based on a business chat room according to the present disclosure may be performed through interconnection between modules. Hereinafter, the operation of each component will be described in detail.

The business chat room creation unit 310 may create a business chat room in response to a request to create a chat room related to a project in the process of carrying out the project. In the case of a project to achieve a certain goal within a specific period, various tasks may be created and processed during the process from the start of the project to the end. The business chat room creation unit 310 may create a business chat room at the requests of people involved in the work, and the business chat room may be used as a means of communication between the people participating in a series of tasks. Meanwhile, the people involved in the work refer to those participating in the project and may include a task creator who creates a task, a task instructor who inputs task instructions, a task processor who processes the task, etc.

In addition, the business chat room creation unit 310 may create a work chat room in response to a request to create a chat room and then invite participants of the project to join the communication through the work chat room, and, in the work chat room, messages as well as objects such as notes, files, and photos may be shared sequentially. Here, a space for data storage for managing objects in the work chat room may be independently created in the memory 230. That is, while a work chat room is maintained, related information may be stored and managed through an independent area for data storage in the memory 230.

In addition, after creating a work chat room, the business chat room creation unit 310 may add detailed information about the chat room, such as information about members of the chat room and information about rules for operating the chat room. Here, information about members of the chat room may include user information, authority information, etc. of participants in the work invited after the chat room had been created.

Furthermore, the business chat room creation unit 310 may provide a dedicated interface for entering a request to create a chat room, and the dedicated interface may be provided through a dedicated agent running in the user's terminal 110. Meanwhile, various objects may be shared in a work chat room created by the business chat room creation unit 310, and the work chat room may be designed to provide a dedicated interface for the objects.

According to an embodiment of the present disclosure, when the business chat room creation unit 310 succeeds in creating a work chat room, it may store the work chat room in correspondence with a corresponding project. In other words, a work chat room may be created and stored in correspondence with either the overall project or a project for a specific task. Meanwhile, once a work chat room is created, related tasks may be shared and managed around the work chat room. In addition, a unique link connecting to the overall project or a project for a specific task may be created and added to the work chat room.

According to an embodiment of the present disclosure, the business chat room creation unit 310 may generate a list of work chat rooms related to the project and provide it as part of detailed information on the project. The business chat room creation unit 310 may perform a search or an inquiry regarding a work chat room using the identification code assigned to the work chat room, and may sort work chat rooms according to creators of chat rooms, the creation time thereof, members thereof, etc. The business chat room creation unit 310 may generate a list of work chat rooms searched for or sorted according to specific conditions. As a result, it may be possible for project participants to easily check detailed information about the status or the operational status of business chat rooms created in relation to the current project.

The message sharing unit 330 may generate chat messages between work participants and work-related messages regarding the project and allow them to be shared through a work chat room. It has been explained herein that messages shared in a work chat room are divided into chat messages and work-related messages, but it is needless to say that they are not limited thereto. Chat messages and work-related messages may be entered on a message input window in a work chat room. The message sharing unit 330 may output input messages on a message window so that they are shared with other work participants. The message sharing unit 330 may provide an alarm for a message input to each work participant, and may count and display the number of members who have not read the message.

According to an embodiment of the present disclosure, the message sharing unit 330 may create objects including notes, files, and photos related to the project and allow them to be shared through a work chat room. To this end, the business chat room may be designed to provide a dedicated interface for various objects, and the message sharing unit 330 may create an object in response to a request for creating the object received through the dedicated interface and then allow it to be shared through the business chat room. Meanwhile, notes shared in a work chat room may be created to further include messages, files, photos, etc. In other words, it may be possible for work participants to selectively attach messages, files, photos, etc. while creating notes, and, when a note is shared through a work chat room, objects included in the note may also be shared with other work participants.

According to an embodiment of the present disclosure, the message sharing unit 330 may create connected objects of the same type that are uniquely linked to each of notes, files, photos, and messages. Here, a connected object may correspond to an independent object connected to an object of the same type. For example, the message sharing unit 330 may create a note linked to a note, a file linked to a file, a photo linked to a photo, or a message linked to a message. When a connected object is created, the message sharing unit 330 may store an object in association with the connected object. An object connected to a connected object may also correspond to a connected object, and, accordingly, objects of the same type may be connected sequentially.

According to an embodiment of the present disclosure, the message sharing unit 330 may provide an interface for creating a connected object. When a connected object that is uniquely connected to an object shared in another business chat room is created in the interface, the message sharing unit 330 may allow the connected object to be shared in the other business chat room. In other words, work participants joining a work chat room may create a connected object connected to an object in another work chat room through an interface provided in the chat room. In this case, the message sharing unit 330 may allow the connected object to be shared by adding it to the other work chat room. For example, when a work participant searches for a note shared in another work chat room and then writes a connected note linked to that note, the message sharing unit 330 may create the connected note and allow it to be shared in the work chat room to which the original note belongs. Likewise, when a connected object of the same type is created for a message, a file, or a photo in addition to a note, the connected object may be automatically added to a related work chat room to be shared.

According to an embodiment of the present disclosure, when creating a second object of the same type that is uniquely linked to a first object, the message sharing unit 330 may create a link defining the hierarchical structure between the first and second objects. That is, the link may correspond to a logical connection between the first object and the second object. Accordingly, since messages and tasks shared in a work chat room are connected to each other through a link, it may be possible for work participants to directly access a task related to a certain message or a message related to a certain task. For example, when work participant A creates message m linked to message M in a work chat room, it may be possible for another work participant B in the business chat room to move to message M linked to message m by selecting message m (for example, by clicking, touching, etc.). In addition, the message sharing unit 330 may search for objects connected to a specific object through a link and provide the results.

The task creation unit 350 may create one or more tasks that are uniquely connected to chat messages or work-related messages and are in a hierarchical relationship with the messages, and may store the tasks in association with the message. For example, when work participants have a conversation about a specific work, a task related to the work may be created by any one of the work participants. In this case, the task may be linked to one of the chat messages. The task creation unit 350 may create tasks uniquely linked to each message shared in a work chat room, and may store and manage tasks for each message.

According to an embodiment of the present disclosure, the task creation unit 350 may create independent tasks uniquely linked to each of notes, files, photos, and tasks. In other words, tasks created in a work chat room may be linked to messages as well as other objects such as notes, files, and photos. In addition, a task may also be linked to another task that has been already created. Accordingly, it may be possible for work participants to share work-related matters through tasks while sharing work-related notes, files, photos, etc. in a work chat room.

According to an embodiment of the present disclosure, when a task is created, the task creation unit 350 may allow the task to be shared in a work chat room. For example, when a work participant searches for a note shared in a work chat room and then creates a task linked to the note, the task creation unit 350 may create the task in the work chat room to which the note belongs and allow it to be shared therein. Likewise, when an independent task is created for a message, a file, or a photo in addition to a note, the task may be automatically added to a related work chat room and shared therein.

According to an embodiment of the present disclosure, when creating a second task uniquely connected to a first task, the task creation unit 350 may create a link defining a hierarchical structure between the first and second tasks. The hierarchical structure may correspond to a hierarchical connection between tasks. That is, when a second task connected to a first task is created, a link may be created between the first and second tasks, and the link may include direction information indicating how they are connected. When the link proceeds from the first task to the second task, it may mean that the second task is connected to the first task and that the second task was created after the first task had been created. Accordingly, it may be possible for work participants to easily access the first task through the link after accessing the second task.

According to an embodiment of the present disclosure, when a task not connected to a specific object is created, the task creation unit 350 may automatically connect the task to the most recent object in a work chat room or to an object selected by a work participant after recommending objects that can be connected to the task. A task may be created by being connected to a message or to other objects, but, if necessary, an independent task, which is not connected to any other objects, may also be created. In this case, when a task is created, the task creation unit 350 may automatically connect the task to an object that has been already created. The object connected to the task may be determined based on the time of creation, but it goes without saying that it is not limited thereto. In addition, the task creation unit 350 may select objects that can be connected to a created task and then recommend such objects by providing a list of the objects that can be selected. In other words, a creator of a task may select a desired object from the list of the recommended objects, so that a link between the object and the task may be created and they may be interconnected.

According to an embodiment of the present disclosure, the task creation unit 350 may provide a user interface (UI) for creating a task through a business chat room, and may receive a signal for requesting the creation of at least one task through the user interface. It may be possible for work participants to create tasks through a user interface provided in a work chat room and to create tasks through an interface provided independently outside the work chat room, if necessary. The task creation unit 350 may initiate an operation to create a task in response to a signal for requesting the creation of a task, and created tasks may be stored in association with connected messages.

According to an embodiment of the present disclosure, when a task is created, the task creation unit 350 may generate and share a log message regarding the creation of the task through a work chat room. The task creation unit 350 may display log messages to be distinguished from chat messages and work-related messages, and the log messages may include information about tasks, information about connected messages, etc.

According to an embodiment of the present disclosure, when a task is created, the task creation unit 350 may update a corresponding message by adding a first signal thereto. Here, the first signal may correspond to a symbol, a text, an emoticon, a tag, etc. indicating the connection of the task, and the created task may be displayed in the connected message. In addition, the task creation unit 350 may separately display messages to which tasks are connected and messages to which no tasks are connected. For example, when a task is linked to a specific message, the task creation unit 350 may update the specific message shared in a work chat room by highlighting the message.

According to an embodiment of the present disclosure, when a task is created and there is another task in a hierarchical relationship with the task, the task creation unit 350 may update a corresponding message by adding a second signal distinct from a first signal thereto. Here, the second signal may correspond to a symbol, a text, an emoticon, a tag, etc. indicating the connection of an additional task, and may be defined to be distinct from the first signal. For example, when a second task connected to a first task is created, the task creation unit 350 may add a second signal to a message connected to the first task. When a first signal has been already added to the message, the first signal may be changed to a second signal, or the second signal may be added together with the first signal.

The task search unit 370 may provide a list of tasks created in a work chat room at the requests of work participants. To this end, the task search unit 370 may provide an interface for a search for the list of tasks in a work chat room. The task search unit 370 may provide search results for a specific task or for tasks that have been already created through an interface.

According to an embodiment of the present disclosure, the task search unit 370 may provide a list of tasks, and may search for and provide at least one of messages, files, photos, and tasks for each task on the list according to the selection of work participants. That is, the task search unit 370 may sort and provide searched tasks, and, when a work participant selects a specific task, it may search for and provide messages, files, photos, or tasks connected to the specific task.

According to an embodiment of the present disclosure, when a specific task on the list is repeatedly selected, the task search unit 370 may sequentially access other tasks in a hierarchical relationship with the task each time the task is selected. For example, when tasks A, B, and C are sequentially connected and a work participant selects task A once from the list generated as a result of the search for tasks, the task search unit 370 may access task B connected to task A. When the work participant selects task A twice from the list, the task search unit 370 may access task C connected to task B. Movement between tasks may be performed through links formed between tasks connected to each other.

The control unit 390 may control the overall operation of the apparatus 130 for managing tasks, and may manage the control flow or the data flow between the business chat room creation unit 310, the message sharing unit 330, the task creation unit 350, and the task search unit 370.

Figure 4:
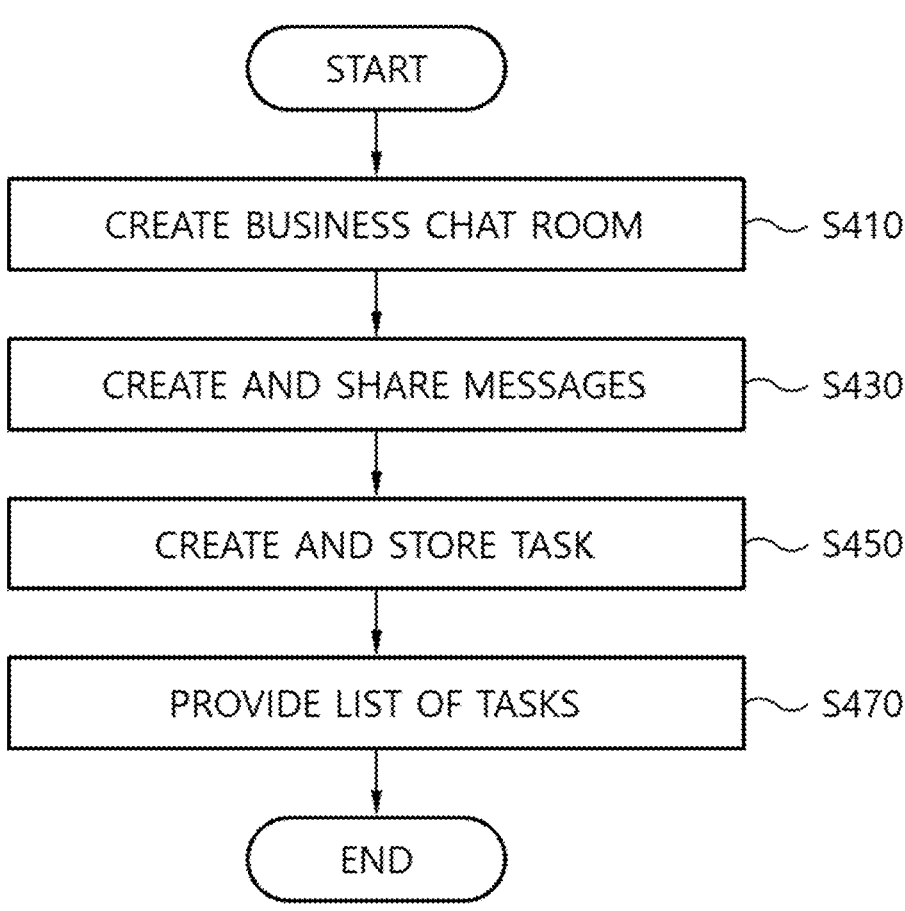
FIG. 4 is a flowchart for illustrating a method of managing tasks based on a work chat room according to the present disclosure.

FIG. 4 is a flowchart for illustrating a method of managing tasks based on a work chat room according to the present disclosure.

Referring to FIG. 4, through the business chat room creation unit 310, the apparatus 130 for managing tasks may create a work chat room in response to a request for creation of a chat room related to a project in the process of advancing the project at S410. Through the message sharing unit 330, the apparatus 130 for managing tasks may generate chat messages between work participants and work-related messages regarding an ongoing project and allow them to be shared in the work chat room at S430.

In addition, through the task creation unit 350, the apparatus 130 for managing tasks may create one or more tasks that are uniquely connected to chat messages or work-related messages and are in a hierarchical relationship with the messages and may store the tasks in association with the messages at S450. Through the task search unit 370, the apparatus 130 for managing tasks may provide a list of tasks created in the work chat room at the requests of the work participants at S470.

Figure 5:
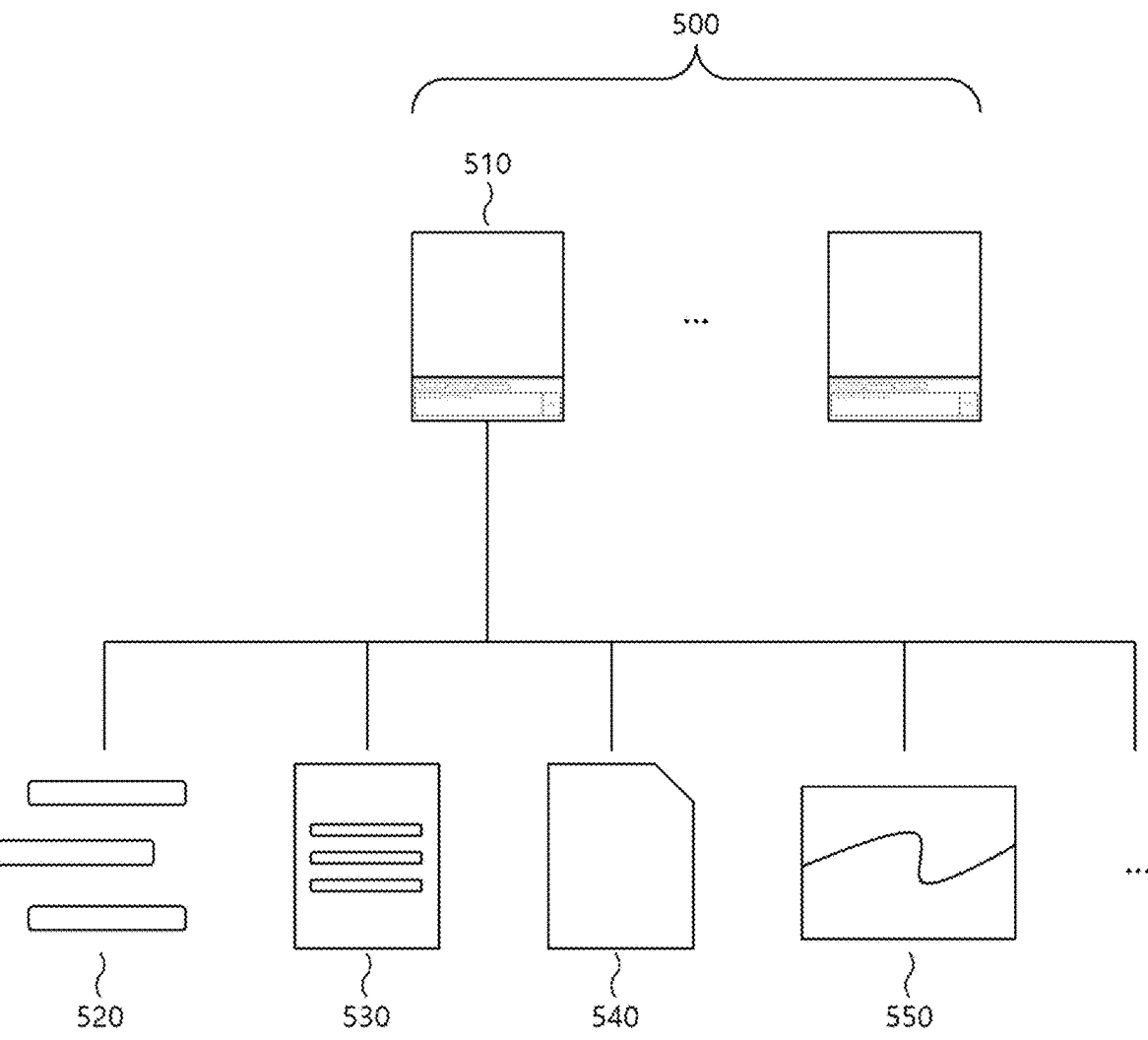
FIG. 5 is a view for illustrating the structure of an object based on a business chat room according to the present disclosure.

FIG. 5 is a view for illustrating the structure of an object based on a business chat room according to the present disclosure.

Referring to FIG. 5, the apparatus 130 for managing tasks may build and provide a structure for efficiently managing work based on a business chat room 510 in the process of advancing an ongoing project. That is, in the process of advancing a project 500, a plurality of business chat rooms 510 may be created, and it may be possible for work participants to exchange work-related messages in each business chat room 510. Here, the business chat room 510 may be designed to share various work-related objects with work participants in addition to messages as a means of managing project-related work.

For example, work participants may share objects such as a message 520, a note 530, a file 540, and a photo 550 in the business chat room 510. Here, the note 530 may be created and shared with other attached objects such as the message 520, the file 540, and the photo 550. As such, the apparatus 130 for managing tasks may facilitate management of tasks and projects by establishing a structure for efficiently managing tasks to achieve a specific purpose based on the business chat room 510 in the process of advancing a project.

Figure 6A:
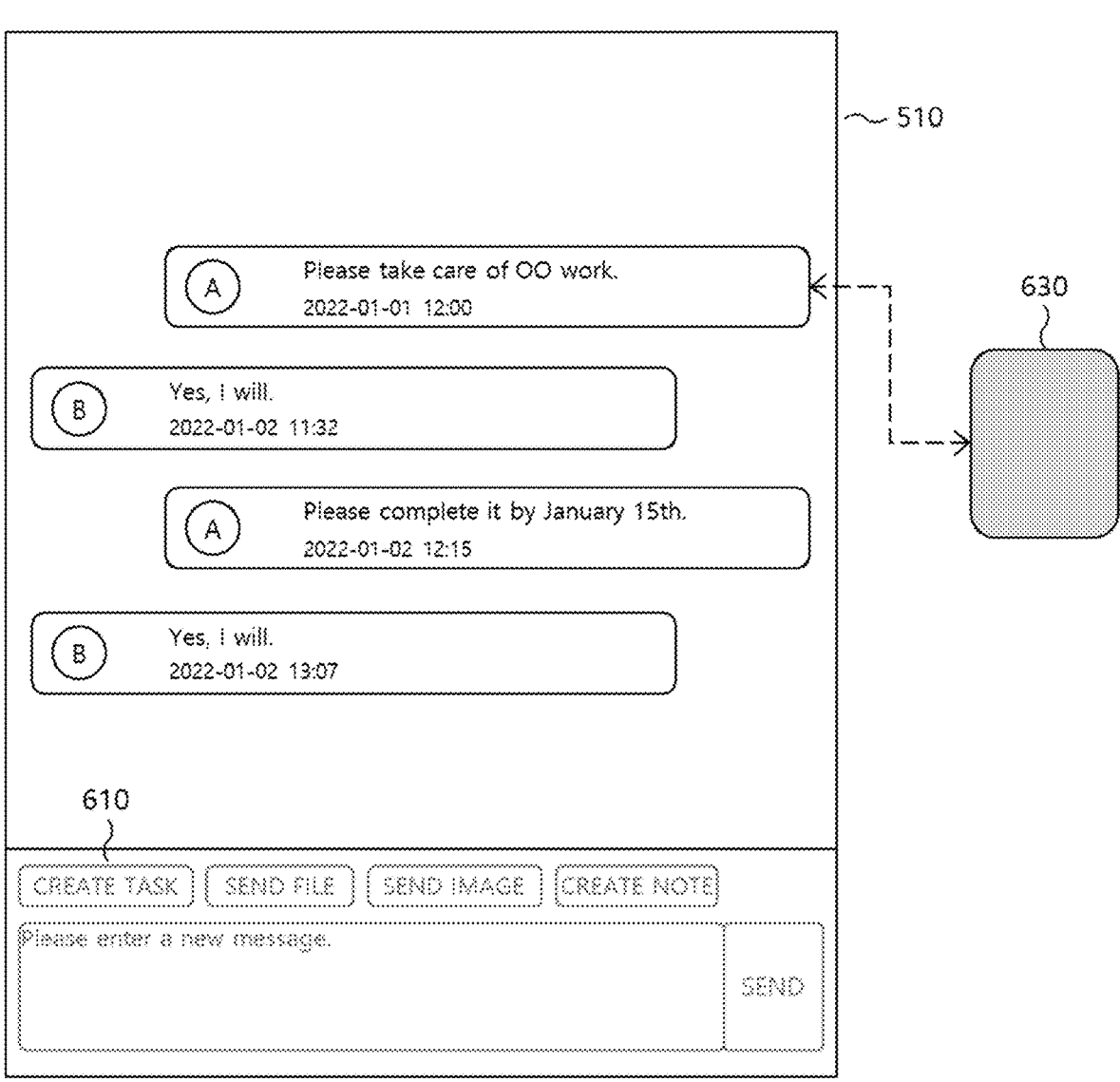
FIGS. 6A and 6B are views for illustrating the process of creating and sharing tasks according to the present disclosure.
Figure 6B:
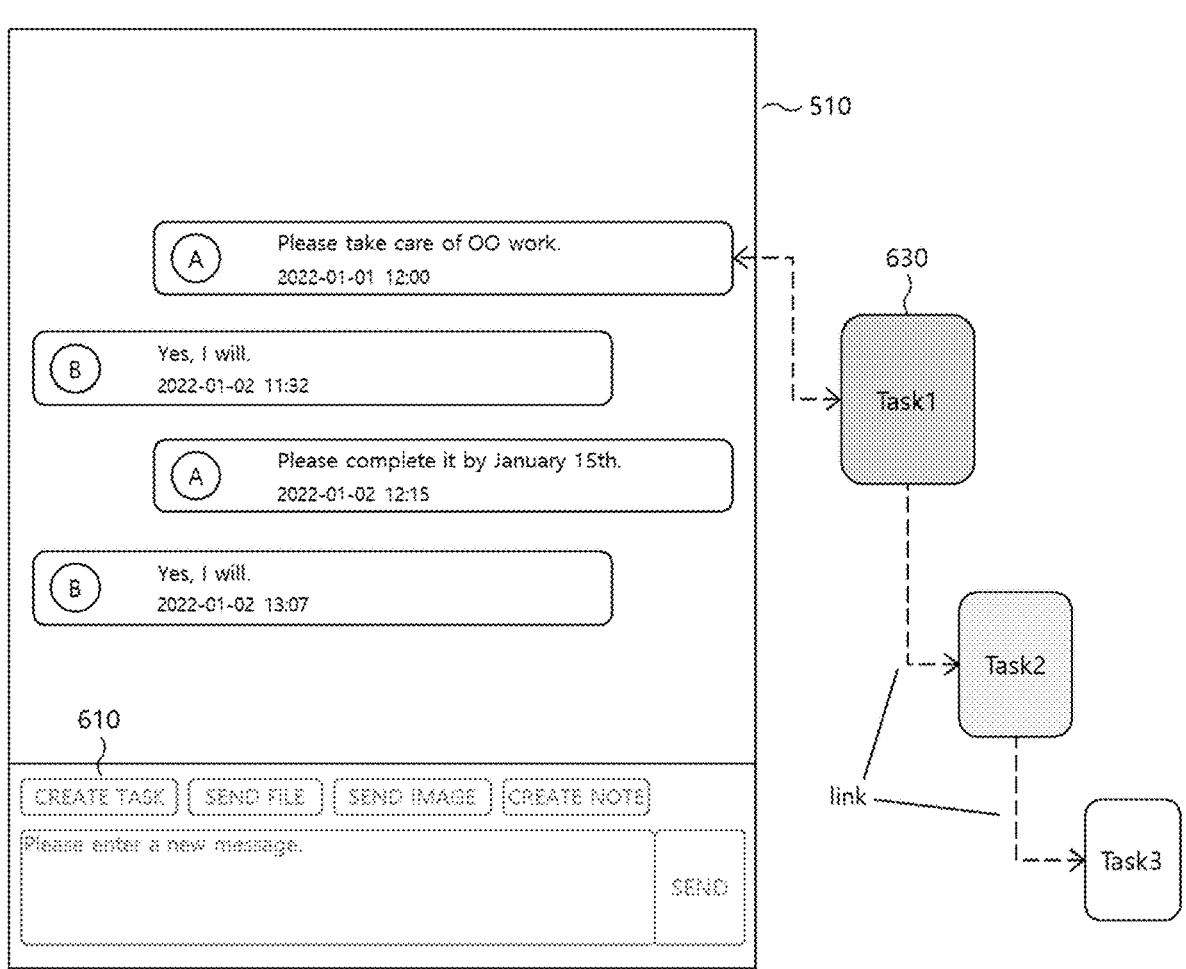

FIGS. 6A and 6B are views for illustrating the process of creating and sharing tasks according to the present disclosure.

Referring to FIG. 6A, the apparatus 130 for managing tasks may create and provide the business chat room 510 while a project is in progress. In the business chat room 510, people involved in the project may share work-related messages as well as everyday messages.

In addition, the business chat room 510 may not be just a means for communication, but may have a range of functions for managing tasks. For example, the business chat room 510 may serve a task creation function 610 of creating and sharing various tasks occurring while work is in progress and a function of allowing work participants to share diverse objects such as files, photos, and notes.

According to an embodiment of the present disclosure, the apparatus 130 for managing tasks may create a task 630 that is uniquely connected to a chat message or a work-related message and is in a hierarchical relationship with the message and may store it in association with the message. Referring to FIG. 6A, after work participant A inputs a work-related message m saying "Please take care of OO work," task T 630 connected to message m may be created. Accordingly, work participant B may enter a response message and simultaneously select message m input by work participant A to access task T connected to message m and check the work details recorded in task T. In addition, work participant B may check the work details recorded in task T and then move back to message m. To this end, message m and task T may be connected to each other through a link.

Referring to FIG. 6B, the apparatus 130 for managing tasks may create independent tasks uniquely linked to each of notes, files, photos, and tasks. That is, the apparatus 130 for managing tasks may repeatedly create a task 630 connected to another task 630, and the tasks 630 created in such a way may be connected in a hierarchical structure according to the order in which they are created. In addition, the tasks connected in a hierarchical structure may be connected through links with direction information. Referring to FIG. 6B, a second task, Task 2, may be connected to a first task, Task 1, and thus a link from the first task to the second task may be created. A link in the same direction may be created between the second task and a third task, Task 3.

According to an embodiment of the present disclosure, the apparatus 130 for managing tasks may create connected objects of the same type uniquely connected to each of notes, files, photos, and messages shared in the business chat room 510. As a result, the apparatus 130 for managing tasks may structure work details with various objects and their connected objects in the business chat room 510, and may facilitate effective management of work by allowing work participants to share the work details.

Figure 7A:
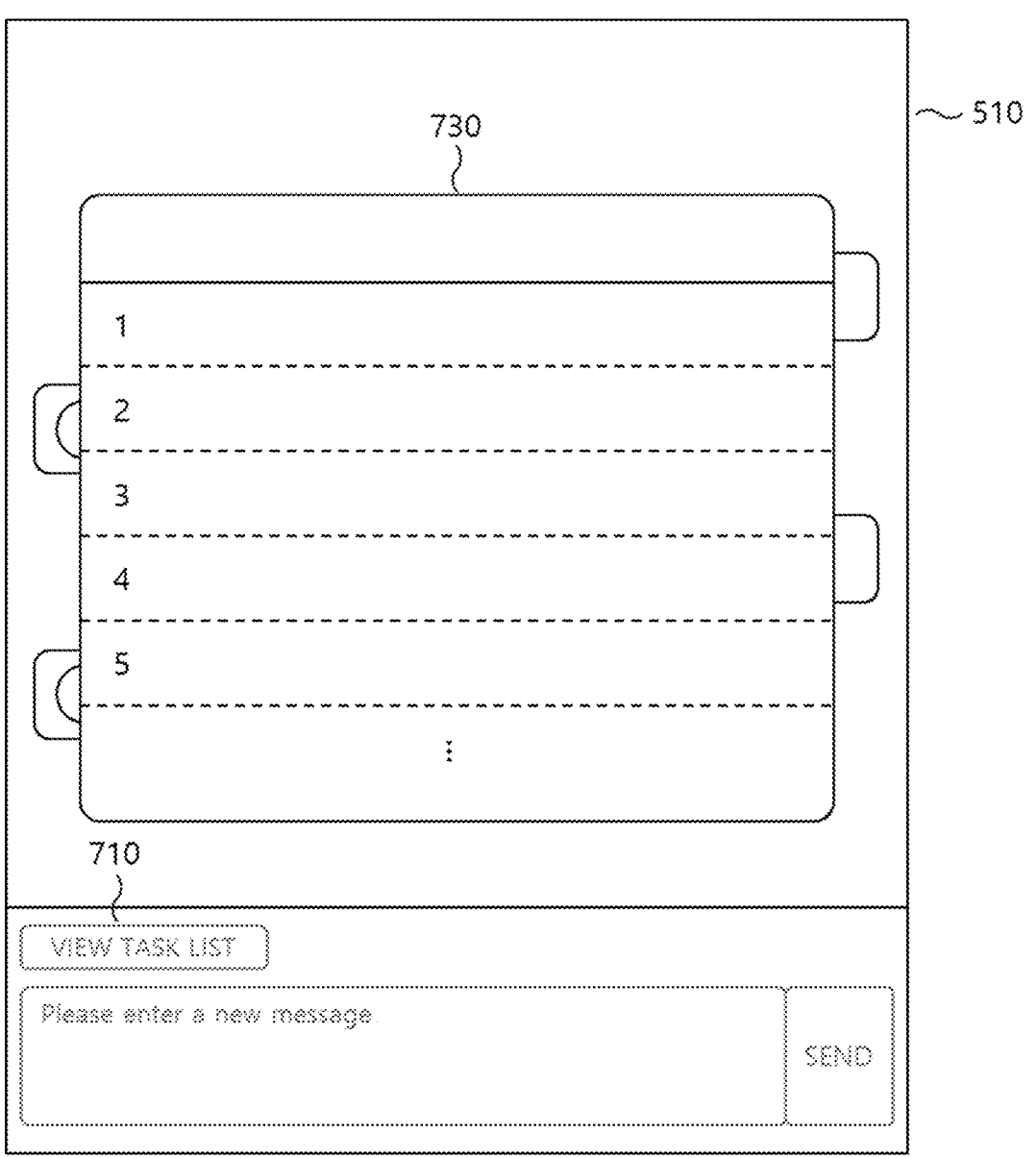
FIGS. 7A and 7B are views for illustrating an embodiment of the process of providing a list of tasks according to the present disclosure.
Figure 7B:
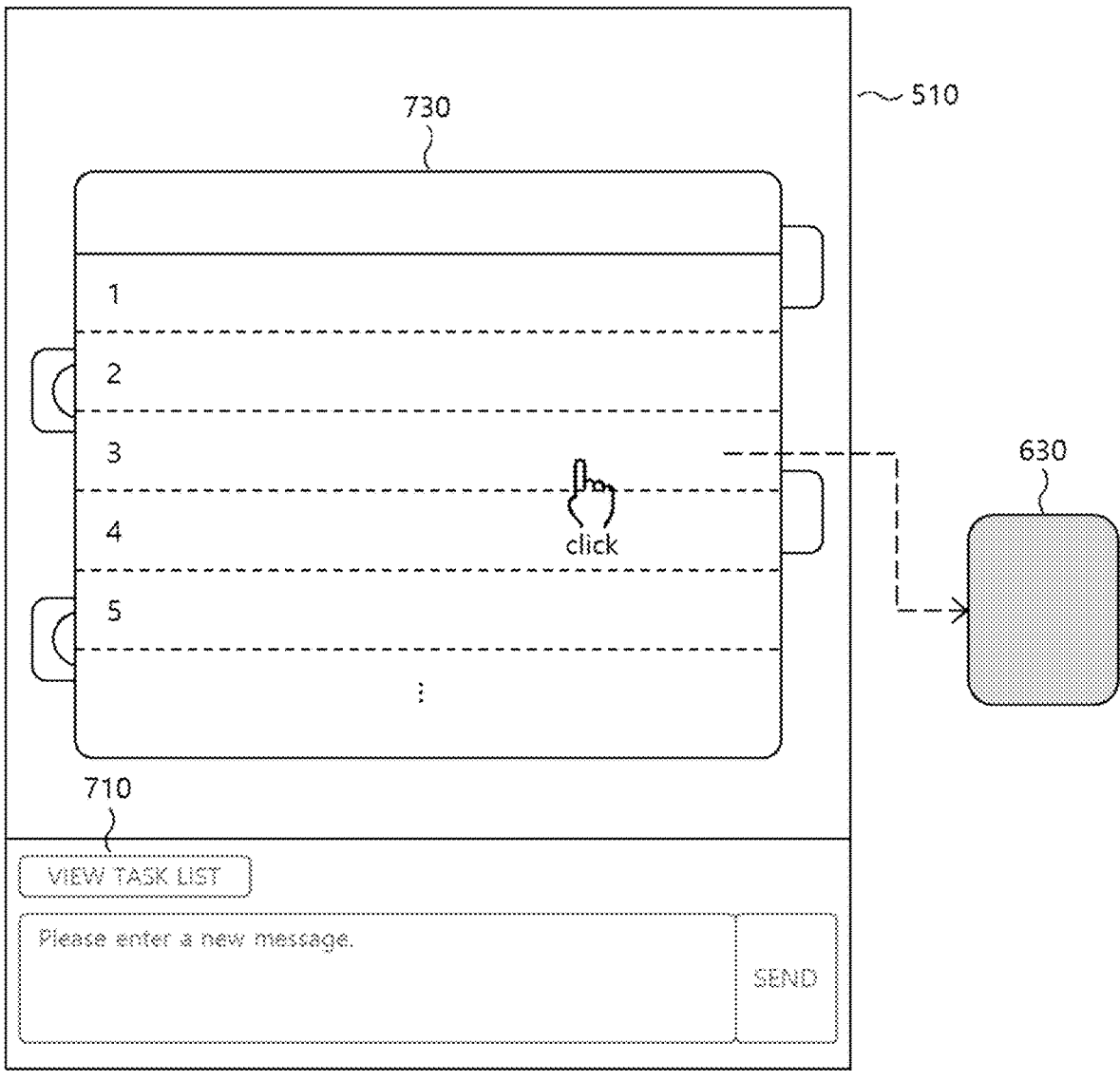

FIGS. 7A and 7B are views for illustrating an embodiment of the process of providing a list of tasks according to the present disclosure.

Referring to FIG. 7A, the apparatus 130 for managing tasks may provide a list of tasks created in the business chat room 510 at the request of a work participant. To this end, the business chat room 510 may be designed to serve a function 710 of showing a list of tasks. The apparatus 130 for managing tasks may generate and provide a list of tasks created in the current chat room through a list-type interface 730 at the request of a work participant. An example in which a list of tasks is in the form of a list is described herein, but it is needless to say that it is not limited thereto.

Referring to FIG. 7B, when a specific task is selected from a list provided by the interface 730, the apparatus 130 for managing tasks may provide direct access to the specific task. Accordingly, it may be possible for work participants to search for tasks 630 created in the business chat room 510 and to select a desired task 630 and easily access it.

Although the present disclosure has been described above with reference to its desirable embodiments, a person having ordinary skill in the art would understand that various modifications and changes can be made to the present disclosure within the technology and the scope of the present disclosure as set forth in the claims below.

What is claimed is:

1. An apparatus for managing tasks based on a business chat room, comprising:

circuitry configured to:

create a business chat room in response to a request to create a chat room related to a project in a process of advancing the project;

generate chat messages between work participants and work-related messages regarding the project and allow the chat and work-related messages to be shared in the business chat room;

create one or more tasks that are uniquely connected to the chat messages or the work-related messages and are in a hierarchical structure with the chat and work-related messages and store the one or more tasks in association with the chat and work-related messages;

provide a list of the one or more tasks created in the business chat room in response to requests of the work participants;

create objects to be shared in the business chat room, a type of the objects including notes, files, or photos related to the project;

create independent tasks uniquely linked to each of the notes, the files, the photos, and the one or more tasks; and share the one or more tasks in the business chat room by automatically adding the one or more tasks to the business chat room so that the one or more tasks is uniquely connected to the chat messages or the work-related messages in the hierarchical structure with the chat and work-related messages in response to the one or more tasks being created.

2. The apparatus of claim 1, wherein the circuitry is further configured to connect an object of one type shared in the business chat room with another object of the one type shared in another business chat room so that the object and the another object are uniquely linked to each other.

3. The apparatus of claim 2, wherein the circuitry is further configured to provide an interface for creating the connected object, and, when a created object of the one type is created in the interface to be connected to the another object of the one type shared in the another business chat room, it allows the created object to be shared in the another business chat room.

4. The apparatus of claim 2, wherein when creating a second object of the one type that is uniquely linked to a first object, the circuitry is further configured to create a link defining the hierarchical structure between the first and second objects.

5. The apparatus of claim 1, wherein when creating a second task uniquely connected to a first task, the circuitry is further configured to create a link defining a hierarchical structure between the first and second tasks.

6. The apparatus of claim 1, wherein when a task not connected to a specific object is created, the circuitry is further configured to automatically connect the task to a most recent object in the business chat room or to an object selected by the work participant after recommending objects that can be connected to the task.

7. The apparatus of claim 1, wherein the circuitry is further configured to provide a user interface for creating the one or more tasks through the business chat room and receive a signal for requesting the creation of the one or more tasks through the user interface.

8. The apparatus of claim 1, wherein when the one or more tasks are created, the circuitry is further configured to generate and share a log message regarding the creation of the one or more tasks through the business chat room.

9. The apparatus of claim 1, wherein when the one or more tasks are created, the circuitry is further configured to update a corresponding message by adding a first signal thereto.

10. The apparatus of claim 9, wherein when the one or more tasks are created and there is another task in the hierarchical structure with the one or more tasks, the circuitry is further configured to update the corresponding message by adding a second signal distinct from the first signal thereto.

11. The apparatus of claim 1, wherein the circuitry is further configured to provide a list of the one or more tasks, and search for and provide at least one of messages, files, photos, and tasks for each task on the list according to a selection of the work participants.

12. The apparatus of claim 1, wherein when a specific task on the list is repeatedly selected, the circuitry is further configured to sequentially access other tasks in the hierarchical structure with the specific task each time the specific task is selected.

13. A method of managing tasks based on a business chat room by an apparatus, the method comprising:

creating a business chat room in response to a request to create a chat room related to a project in a process of advancing the project;

generating chat messages between work participants and work-related messages regarding the project and allowing the chat and work-related messages to be shared in the business chat room;

creating one or more tasks that are uniquely connected to the chat messages or the work-related messages and are in a hierarchical structure with the chat and work-related messages and storing the one or more tasks in association with the chat and work-related messages;

providing a list of the one or more tasks created in the business chat room in response to requests of the work participants;

creating objects to be shared in the business chat room, a type of the objects including notes, files, or photos related to the project;

creating independent tasks uniquely linked to each of the notes, the files, the photos, and the one or more tasks; and sharing the one or more tasks in the business chat room by automatically adding the one or more tasks to the business chat room so that the one or more tasks is uniquely connected to the chat messages or the work-related messages in the hierarchical structure with the chat and work-related messages in response to the one or more tasks being created.

* * * * *